(12) United States Patent
Kasahara et al.

(10) Patent No.: US 9,321,929 B2
(45) Date of Patent: Apr. 26, 2016

(54) INK COMPOSITION CONTAINING MAGENTA SOLID SOLUTION PIGMENT AND INK JET RECORDING METHOD USING THE SAME

(71) Applicant: Seiko Epson Corporation, Tokyo (JP)

(72) Inventors: Nagatoshi Kasahara, Matsumoto (JP); Miharu Kanaya, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/964,534

(22) Filed: Aug. 12, 2013

(65) Prior Publication Data

US 2013/0331486 A1  Dec. 12, 2013

Related U.S. Application Data

(62) Division of application No. 11/922,684, filed as application No. PCT/JP2006/312354 on Jun. 20, 2006.

(30) Foreign Application Priority Data

Jun. 20, 2005 (JP) .................. 2005-179433

(51) Int. Cl.
| | |
|---|---|
| C09D 11/00 | (2014.01) |
| C09D 11/30 | (2014.01) |
| C09D 11/322 | (2014.01) |
| C09D 11/326 | (2014.01) |

(52) U.S. Cl.
CPC .............. *C09D 11/30* (2013.01); *C09D 11/322* (2013.01); *C09D 11/326* (2013.01)

(58) Field of Classification Search
CPC .... C09D 11/30; C09D 11/322; C09D 11/326; C09D 11/106; C09D 11/107; Y10T 428/24802
USPC ................ 523/160, 161; 106/31.13, 31.49; 534/90; 427/256; 347/100
See application file for complete search history.

(56) References Cited

U.S. PATENT DOCUMENTS

| | | | |
|---|---|---|---|
| 4,957,553 A | 9/1990 | Koike et al. | |
| 5,075,699 A | 12/1991 | Koike et al. | |
| 2002/0065347 A1* | 5/2002 | Freeman et al. | ............... 524/397 |
| 2005/0004261 A1* | 1/2005 | Yatake | .......................... 523/160 |
| 2005/0036021 A1* | 2/2005 | Ito et al. | ....................... 347/100 |

FOREIGN PATENT DOCUMENTS

| | | |
|---|---|---|
| EP | 0859037 A1 | 8/1998 |
| JP | 63-139964 | 6/1988 |
| JP | 10-120956 | 5/1998 |

(Continued)

*Primary Examiner* — Ruiyun Zhang
(74) *Attorney, Agent, or Firm* — Harness, Dickey & Pierce, P.L.C.

(57) ABSTRACT

Disclosed is an ink composition for ink jet recording that can realize excellent printing quality on various recording media, has a high level of color developing properties particularly on plain paper, and can realize excellent gloss for glossy paper and, at the same time, is excellent in ink reliability such as ejection stability, storage stability, and recovery from clogging. The ink composition includes at least a magenta solid solution pigment, a polymer, which can render the pigment dispersible in the ink composition, and water. The polymer is produced by copolymerizing a monomer composition including at least a styrene macromer (A) and a salt forming group-containing monomer (B).

10 Claims, 1 Drawing Sheet

(56) References Cited

FOREIGN PATENT DOCUMENTS

| JP | 10-219166 | | 8/1998 |
| JP | 10219166 A | * | 8/1998 |
| JP | 11-049998 | | 2/1999 |
| JP | 11-209672 | | 8/1999 |
| JP | 2003-012744 A | | 1/2003 |
| JP | 2004-075988 A | | 3/2004 |
| JP | 2004-306441 A | | 11/2004 |
| JP | 2005-029597 A | | 2/2005 |
| JP | 2005-029626 A | | 2/2005 |
| JP | 2005-126729 A | | 5/2005 |

* cited by examiner

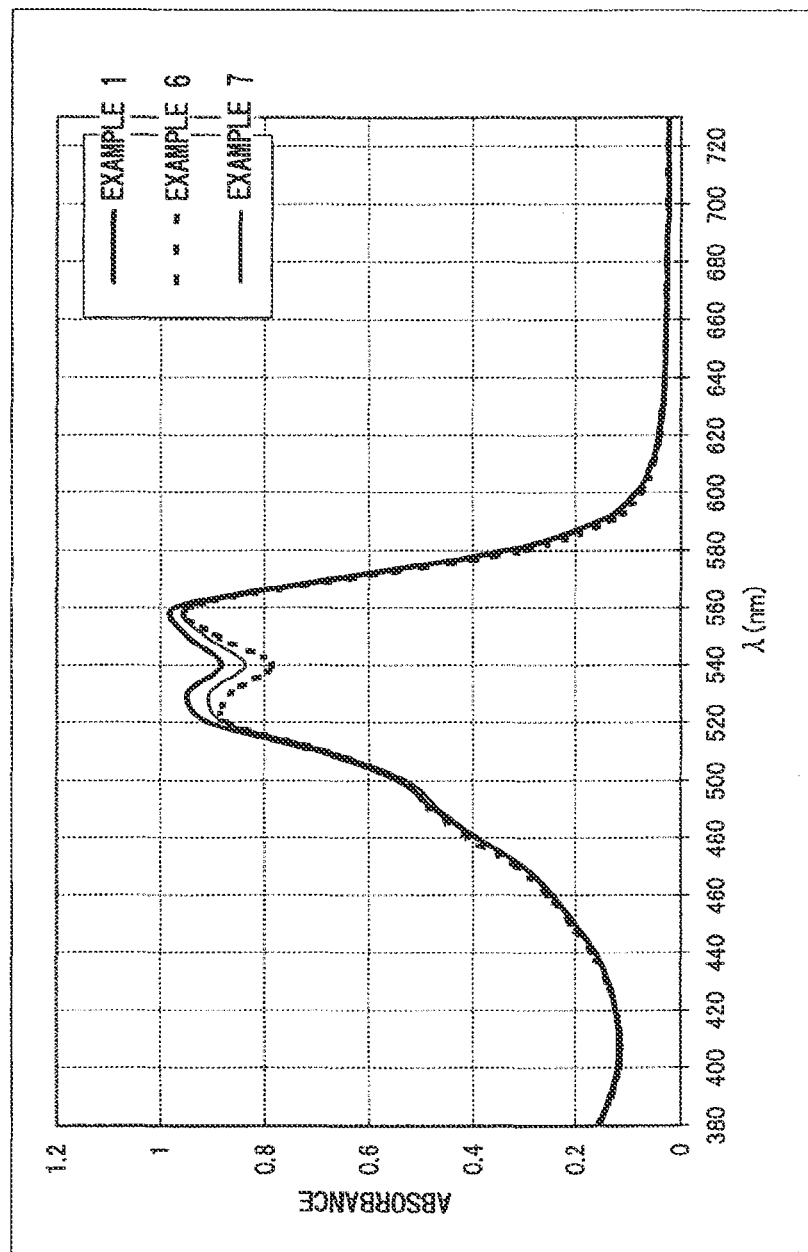

INK COMPOSITION CONTAINING MAGENTA SOLID SOLUTION PIGMENT AND INK JET RECORDING METHOD USING THE SAME

CROSS-REFERENCE TO RELATED APPLICATIONS

This is a divisional application of U.S. application Ser. No. 11/922,684 filed Jun. 1, 2009 which is a National Phase Application of PCT/JP2006/312354 filed Jun. 20, 2006, which claims priority to Japan Patent Application No. 2005-179433 filed Jun. 20, 2005, all of which are incorporated by reference herein in their entireties.

BACKGROUND OF THE INVENTION

1. Field of Invention

The present invention relates to an ink composition for ink jet recording, which exhibits excellent printing quality on various recording media, can develop a high level of color developing properties particularly on plain papers, and, at the same time, can exhibit high gloss on gloss paper and is excellent in ink reliability such as ejection stability, storage stability, and recovery from clogging, a recording method using this ink composition, and a recorded matter.

2. Background Art

Ink jet recording is a method wherein ink is ejected as droplets through fine nozzle heads to record letters or FIGURES onto the surface of recording media such as paper. Ink jet recording methods which have been put to practical use include a method wherein an electric signal is converted to a mechanical signal using an electrostrictive element to intermittently eject droplets of ink reservoired in a nozzle head section, thereby recording letters or symbols on the surface of a recording medium, and a method wherein an ink liquid, reservoired in a nozzle head section, in its portion very close to the ejection portion is rapidly heated to create a bubble and droplets of the ink are intermittently ejected by volume expansion created by the bubble to record letters or symbols on the surface of a recording medium.

In recent years, there is an increasing tendency toward the use of printed matter, formed by printing with an ink jet printer, as a display in an indoor environment as well as in an outdoor environment for advertisement or appreciation purposes, and the development of an ink having excellent fastness properties such as excellent lightfastness, gasfastness, and waterfastness has been demanded. To meet this demand, an ink using a pigment having excellent fastness properties such as excellent lightfastness, waterfastness, and gasfastness as a colorant has been developed.

JP H11 (1999)-209672 proposes a water-based pigment ink comprising a pigment covered with a specific polymer, which water-based pigment ink has a high level of color developing properties and excellent lightfastness. JP H10 (1998)-120956 proposes an ink set comprising a combination of specific pigments. Further, JP H10 (1998)-219166 and JP H11 (1999)-49998 propose an ink composition using a quinacridone pigment or a magenta solid solution pigment as a pigment for use for a magenta color, which ink composition has color rendering properties comparable with magenta dyes and, at the same time, is excellent in lightfastness and gasfastness.

Further, a water-based ink containing a surfactant and a polymeric dispersant added thereto and having excellent pigment dispersion, and an ink comprising a pigment as a colorant covered with a dispersing resin have been proposed. Inks with fine particles of pigment having a given particle diameter dispersed therein exhibit excellent color developing properties on various recording media, particularly on plain papers.

When the ink with fine particles of pigment dispersed therein is printed on recording media having a smoothly processed surface such as gloss paper, however, glossiness of the recorded part is sometimes deteriorated by irregular reflection of light.

Further, in the water-based ink with a surfactant and a polymeric dispersant added thereto, upon the vaporization of water and other volatile components in the course of drying of the ink after deposition of the ink onto the recording medium, the dispersion stable system of the ink is broken, often disadvantageously leading to the aggregation of the pigment. As a result, the aggregate of this pigment deteriorates the gloss of the recorded part, renders the gloss of the printed image uneven, and sometimes results in deteriorated printing quality.

SUMMARY OF THE INVENTION

The present inventors have now found that, in an ink using a magenta solid solution pigment as a colorant, a combination of the ink with a dispersant polymer having a specific structure can realize an ink composition for ink jet recording that can realize excellent printing quality on various recording media, has a high level of color developing properties particularly on plain papers, and can realize excellent gloss for glossy paper and, at the same time, is excellent in ink reliability such as ejection stability, storage stability, and recovery from clogging. The present invention has been made based on such finding.

Accordingly, an object of the present invention is to provide an ink composition for ink jet recording that can realize excellent printing quality on various recording media, has a high level of color developing properties particularly on plain papers, and can realize excellent gloss for glossy paper and, at the same time, is excellent in ink reliability such as ejection stability, storage stability, and recovery from clogging.

The above object can be attained by an ink composition comprising at least a magenta solid solution pigment, a dispersant polymer, which can render the pigment dispersible in the ink composition, and water, wherein the dispersant polymer has been produced by copolymerizing a monomer composition comprising at least a styrene macromer (A) and a salt forming group-containing monomer (B).

The present invention can realize an ink composition for ink jet recording that can realize excellent printing quality on various recording media, has a high level of color developing properties particularly on plain papers, and can realize excellent gloss for glossy paper and, at the same time, is excellent in ink reliability such as ejection stability, storage stability, and recovery from clogging.

BRIEF DESCRIPTION OF THE DRAWING

FIG. 1 is a diagram showing a UV visible light absorption spectra of inks prepared in Examples 1, 6 and 7.

DETAILED DESCRIPTION OF THE INVENTION

Magenta Solid Solution Pigment

According to the present invention, a combination of a magenta solid solution pigment with a dispersant polymer, which will be described later, can realize an ink composition for ink jet recording that has a high level of color developing properties particularly on plain papers, and can realize excellent gloss for glossy paper and, at the same time, is excellent in ink reliability such as ejection stability, storage stability, and recovery from clogging.

The magenta solid solution pigment used in the ink composition according to the present invention is preferably a solid solution pigment comprising two or more quinacridone compounds selected from the group consisting of unsubstituted quinacridone, 3,10-dichloroquinacridone, 2,9-dimethylquinacridone, and 2,9-dichloroquinacridone. Specifically, the magenta solid solution pigment is a solid solution pigment comprising two or more quinacridone compounds selected from four quinacridone compounds, that is, unsubstituted quinacridone represented by the following formula:

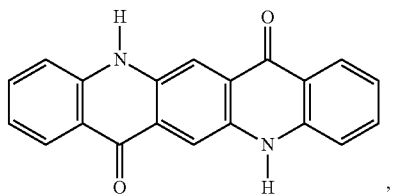 [SMILES: O=c1c2ccccc2[nH]c2cc3c(=O)c4ccccc4[nH]c3cc12]

3,10-dichloroquinacridone of which the 3- and 10-positions have been substituted by chlorine, 2,9-dimethylquinacridone of which the 2- and 9-positions have been substituted by methyl group, and 2,9-dichloroquinacridone of which the 2- and 9-positions have been substituted by chlorine.

The quinacridone compounds may be commercially available products. Specifically, the unsubstituted quinacridone may be one commercially available as C.I. Pigment Violet 19; 3,10-dichloroquinacridone may be one commercially available as C.I. Pigment Red 209; 2,9-dimethylquinacridone may be one commercially available as C.I. Pigment Red 122; and 2,9-dichloroquinacridone may be one commercially available as C.I. Pigment Red 202.

The combination of the two or more quinacridone compounds is not particularly limited. In the present invention, however, a solid solution pigment comprising a combination of unsubstituted quinacridone with 3,10-dichloroquinacridone, a combination of unsubstituted quinacridone with 2,9-dimethylquinacridone, or a combination of unsubstituted quinacridone with 2,9-dichloroquinacridone is preferred. In particular, the use of a combination of the solid solution pigment, comprising the above combination, with an acetylene compound having a specific structure which will be described later, can contribute to a further improvement in color developing property on plain papers.

The mixing ratio between the unsubstituted quinacridone and the 3,10-dichloroquinacridone in the solid solution pigment is preferably unsubstituted quinacridone:3,10-dichloroquinacridone=10:90 to 90:10, more preferably 15:85 to 85:15. Further, the mixing ratio between the unsubstituted quinacridone and 2,9-dimethylquinacridone is unsubstituted quinacridone:2,9-dimethylquinacridone=10:90 to 90:10, more preferably 15:85 to 85:15. The mixing ratio between the unsubstituted quinacridone and 2,9-dichloroquinacridone is unsubstituted quinacridone:2,9-dichloroquinacridone=10:90 to 90:10, more preferably 15:85 to 85:15.

The magenta solid solution pigment may be produced by any method without particular limitation, and conventional production processes may be used. Specific examples of such processes include those disclosed in Japanese Patent Laid-Open No. 49998/1999, Japanese Patent Laid-Open No. 319534/2000, and Japanese Patent Laid-Open No. 253150/2003.

In the present invention, preferably, the magenta solid solution pigment has an average particle diameter of 10 to 200 nm, more preferably 50 to 150 nm. When the average particle diameter is in the above-defined range, good weathering resistance and good ejection stability can be advantageously realized.

In a preferred embodiment of the present invention, the ink composition according to the present invention exhibits a UV visible absorption spectrum wherein at least one absorption peak is present at a wavelength of 510 nm to 535 nm and at least one absorption peak is present at a wavelength of 550 nm to 570 nm, and the maximum value A of the absorbance in the wavelength range of 510 to 535 nm and the maximum value B of the absorbance in the wavelength range of 550 nm to 570 nm satisfies a relationship of $0.9<A/B<1.0$. The above light absorption spectrum can be realized by the selection and ratio of pigment species in the magenta solid solution pigment, and the selection of other ink composition.

Dispersant Polymer

In the present invention, the dispersant polymer is produced by copolymerizing a monomer composition comprising at least a styrene macromer (A) and a salt forming group-containing monomer (B).

Styrene macromer (A) is a styrenic macromonomer having a number average molecular weight of 500 to 500,000.

An example of preferred styrene macromer (A) is a macromer which has a polymerizable functional group at its one end and preferably has a number average molecular weight of 500 to 500,000, more preferably 1,000 to 10,000.

Specific examples of preferred styrene macromer (A) include styrenic macromers having a polymerizable functional group at one end thereof and styrene-acrylonitrile macromers having a polymerizable functional group at one end thereof. Among them, styrenic macromers having a polymerizable functional group at one end thereof are preferred from the viewpoint of satisfactorily incorporating the magenta solid solution pigment into the vinyl polymer.

Acrylonitrile may be mentioned as a monomer other than styrene constituting the styrenic macromonomer having a polymerizable functional group at its one end. The content of styrene is preferably not less than 60% by weight, more preferably not less than 70% by weight, from the viewpoint of satisfactorily incorporating the pigment in the vinyl polymer.

Among styrenic macromers having a polymerizable functional group at one end thereof, those having an acryloyloxy or methacryloyloxy group as the polymerizable functional group at one end thereof are preferred.

Commercially available styrenic macromers include, for example, AS-6, AN-6, AN-6S, HS-6S, and HS-6, manufactured by TOAGOSEI Co., Ltd.

The content of the styrene macromer in the dispersant polymer is preferably 0.1 to 40% by weight, more preferably 1 to 30% by weight, from the viewpoints of waterfastness and scratch/rubbing resistance.

Preferred salt forming group-containing monomers (B) as a comonomer component in the dispersant polymer are anionic monomers or cationic monomers. The anionic monomers and the cationic monomers may be used either solely or as a mixture of two or more.

A specific example of the anionic monomer is at least one monomer selected from the group consisting of unsaturated carboxylic acid monomers, unsaturated sulfonic acid monomers, and unsaturated phosphoric acid monomers.

Specific examples of unsaturated carboxylic acid monomers include, for example, acrylic acid, methacrylic acid, crotonic acid, itaconic acid, maleic acid, fumaric acid, citraconic acid, and 2-methacryloyloxymethylsuccinic acid. They may be used either solely or as a mixture of two or more.

From the viewpoint of ink viscosity and ejection stability, preferred anionic monomers are unsaturated carboxylic acid monomers, and acrylic acid and methacrylic acid are more preferred.

Cationic monomers include polyvinylamine, polyallylamine, N,N-dimethylaminoethylacrylate, and N,N-dimethylaminopropylacrylamide. Among them, N,N-dimethylaminoethylacrylate and N,N-dimethylaminopropylacrylamide are preferred.

The content of the salt forming group-containing monomer (B) in the dispersant polymer is 3 to 40% by weight, preferably 5 to 30% by weight, from the viewpoint of dispersion stability and ejection stability.

In a preferred embodiment of the present invention, the dispersant polymer further comprises a polyoxyalkylene group-containing monomer (C).

Preferably, the polyoxyalkylne group-containing monomer (C) comprises one or more monomers selected from the group consisting of monomer C1 represented by formula (I):

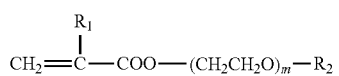

wherein $R^1$ represents a hydrogen atom or a methyl group; $R^2$ represents a hydrogen atom, an alkyl group having 1 to 20 carbon atoms or an alkylphenyl group having 1 to 9 carbon atoms; and m is a number of 1 to 30, monomer C2 represented by formula (II):

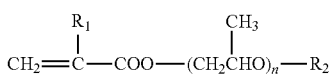

wherein $R^1$ and $R^2$ are as defined in formula (I); and n is a number of 1 to 30, monomer C3 represented by formula (III):

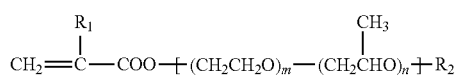

wherein $R^1$, $R^2$, and m are as defined in formula (I); n is as defined in formula (II); and the oxyethylene groups and the oxypropylene groups in [ ] are attached as a block polymer or a random polymer, and monomer C4 represented by formula (IV):

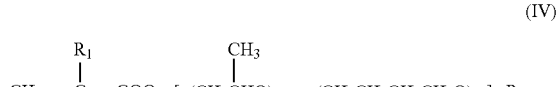

wherein $R^1$, $R^2$, and m are as defined in formula (III); n is as defined in formula (IV); and the oxypropylene groups and the oxytetramethylene groups in [ ] are attached as a block polymer or a random polymer.

Polyethylene glycol mono(meth)acrylate may be mentioned as a specific example of monomer C1. Specific examples of commercially available monomer A include: NK Ester M-20G, NK Ester M-40G, NK Ester M-90G, and NK Ester M-230G, manufactured by Shin-Nakamura Chemical Co., Ltd.; and Blemmer PE series, Blemmer PME-100, Blemmer PME-200, Blemmer PME-400, and Blemmer PME-1000, manufactured by Nippon Oils & Fats Co., Ltd.

Specific examples of monomer C2 include polypropylene glycol mono(meth)acrylate.

Specific examples of monomer C3 include ethylene glycol/propylene glycol (meth)acrylate, poly(ethylene glycol/propylene glycol) mono(meth)acrylate, octoxy polyethylene glycol/polypropylene glycol mono(meth)acrylate, octoxy poly(ethylene glycol/propylene glycol) mono(meth)acrylate, stearoxy polyethylene glycol/polypropylene glycol mono(meth)acrylate, stearoxy poly(ethylene glycol/propylene glycol) mono(meth)acrylate, nonylphenoxy polyethylene glycol/polypropylene glycol mono(meth)acrylate, and nonylphenoxy poly(ethylene glycol/propylene glycol) mono(meth)acrylate. They may be used either solely or as a mixture of two or more.

Specific examples of monomer C4 include propylene glycol/tetramethylene glycol mono(meth)acrylate, poly(propylene glycol/tetramethylene glycol) mono(meth)acrylate, propylene glycol/polybutylene glycol mono(meth)acrylate, and poly(propylene glycol/butylene glycol) mono(meth)acrylate. They may be used either solely or as a mixture of two or more.

Among monomers C1 to C4, polyethylene glycol mono(meth)acrylate, polypropylene glycol mono(meth)acrylate, ethylene glycol/propylene glycol(meth)acrylate, and poly(ethylene glycol/propylene glycol) mono(meth)acrylate are preferred from the viewpoints of ink viscosity and ejection stability.

Specific examples of commercially available monomers C2 to C4, include, for example, Blemmer PP-1000, Blemmer PP-500, Blemmer PP-800, Blemmer AP-150, Blemmer AP-400, Blemmer AP-550, Blemmer AP-800, Blemmer 50 PEP-300, Blemmer 70 PEP-3506, Blemmer AEP series, Blemmer 30 PPT-800, Blemmer 50 PPT-800, Blemmer 70 PPT-800, Blemmer APT series, Blemmer 10 PPB-500B, Blemmer 10 APB-500B, Blemmer 50 POEP-800B, Blemmer 50 AOEP-800B, Blemmer ASEP series, Blemmer PNEP series, Blemmer PNPE series, Blemmer 43 ANEP-500, and Blemmer 70 ANEP-550, manufactured by Nippon Oils & Fats Co., Ltd.

The content of polyoxyalkylen group-containing monomer (C) in the dispersant polymer is preferably 5 to 45% by weight, preferably 5 to 35% by weight, from the viewpoints of print density and ink viscosity.

In the present invention, preferably, the dispersant polymer further comprises a monomer (D) copolymerizable with the styrene macromer (A), the salt forming group-containing monomer (B), and the polyoxyalkylene group-containing monomer (C).

Copolymerizable monomers (D) include (meth)acrylic esters, aromatic ring-containing monomers, and macromers. These monomers may be used either solely or as a mixture of two or more. Monomer (D) preferably contains at least one monomer selected from the group consisting of aromatic ring-containing monomers and macromers from the viewpoints of waterfastness and scratch/rubbing resistance.

(Meth)acrylic esters include, for example, (meth)acrylic esters in which the ester part is an alkyl group having 1 to 18 carbon atoms, for example, methyl(meth)acrylate, ethyl (meth)acrylate, (iso)propyl(meth)acrylate, (iso or tertiary) butyl(meth)acrylate, (iso)amyl(meth)acrylate, cyclohexyl (meth)acrylate, benzyl(meth)acrylate, 2-ethylhexyl(meth) acrylate, (iso)octyl(meth)acrylate, (iso)decyl(meth)acrylate, (iso)dodecyl(meth)acrylate, and (iso)stearyl(meth)acrylate. They may be used either solely or as a mixture of two or more.

The term "(iso or tertiary)" and the term "(iso)" as used herein mean both the case where these groups are present and the case where these groups are absent. When these groups are absent, the compounds are normal.

The aromatic ring-containing monomer is preferably at least one monomer selected from the group consisting of styrene, vinylnaphthalene, α-methylstyrene, vinyltoluene, ethyl vinylbenzene, 4-vinylbiphenyl, 1,1-diphenylethylene, benzyl(meth)acrylate, phenoxyethyl(meth)acrylate, 2-hydroxy-3-phenoxypropyl acrylate, 2-methacryloyloxyethyl-2-hydroxypropyl phthalate, 2-acryloyloxyethylphthalic acid, and neopentyl glycol acrylate benzoate from the viewpoint of waterfastness. Among them, at least one monomer selected from the group consisting of styrene, α-methylstyrene, vinyltoluene, and vinylnaphthalene is more preferred from the viewpoints of waterfastness and scratch/rubbing resistance.

Macromers include those that have a polymerizable functional group on one end thereof and preferably have a number average molecular weight of 500 to 500,000, more preferably 1,000 to 10,000.

Specific examples of macromers include styrenic macromers having a polymerizable functional group on one end thereof, silicone macromers having a polymerizable functional group on one end thereof, methyl methacrylate macromers having a polymerizable functional group on one end thereof, styrene-acrylonitrile macromers having a polymerizable functional group on one end thereof, butyl acrylate macromers having a polymerizable functional group on one end thereof, and isobutyl methacrylate macromers having a polymerizable functional group on one end thereof. Among them, styrenic macromers having a polymerizable functional group on one end thereof are preferred from the viewpoint of satisfactorily incorporating the magenta solid solution pigment into the dispersant polymer.

A styrene homopolymer having a polymerizable functional group on its one end and a copolymer of styrene with another monomer having a polymerizable functional group on its one end may be mentioned as the styrenic macromer containing a polymerizable functional group on its one end.

In the copolymer of styrene with another monomer having a polymerizable functional group on its one end, examples of another monomers include acrylonitrile. The content of styrene is preferably not less than 60% by weight, more preferably not less than 70% by weight, from the viewpoint of satisfactorily incorporating the magenta solid solution pigment in the dispersant polymer.

Among styrenic macromers having a polymerizable functional group on one end thereof, those having an acryloyloxy or methacryloyloxy group as the polymerizable functional group on one end thereof are preferred.

Commercially available styrenic macromers include, for example, AS-6, AN-6, AN-6S, HS-6S, and HS-6, manufactured by TOAGOSEI Co., Ltd.

The content of copolymerizable monomer (D) in the dispersant polymer is 15 to 87% by weight, preferably 15 to 75% by weight, more preferably 15 to 50% by weight, from the viewpoints of print density and waterfastness.

The content of the aromatic ring-containing monomer in the dispersant polymer is preferably 0.1 to 70% by weight, more preferably 1 to 50% by weight, from the viewpoints of waterfastness, scratch/rubbing resistance, ink viscosity, and ejection stability.

The content of the macromer in the dispersant polymer is preferably 0.1 to 40% by weight, more preferably 1 to 30% by weight, from the viewpoints of waterfastness and scratch/rubbing resistance.

The content of each monomer in the monomer composition comprising styrene macromer (A), salt forming group-containing monomer (B), polyoxyalkylene group-containing monomer (C), and copolymerizable monomer (D) is 0.1 to 40% by weight (preferably 1 to 30% by weight) for styrene macromer (A), 3 to 40% by weight (preferably 5 to 30% by weight) for salt forming group-containing monomer (B), 5 to 45% by weight (preferably 5 to 35% by weight) for polyoxyalkylene group-containing monomer (C), and 15 to 87% by weight (preferably 15 to 75% by weight) for copolymerizable monomer (D).

The weight average molecular weight of the dispersant polymer is preferably 3,000 to 300,000, more preferably 5,000 to 200,000, from the viewpoints of print density and ejection stability.

Synthesis of Dispersant Polymer

The dispersant polymer may be synthesized by polymerizing the above monomer-containing composition by the following method.

The polymerization may be carried out by a conventional polymerization method such as a bulk polymerization method, a solution polymerization method, a suspension polymerization method, or an emulsion polymerization method. Among these polymerization methods, the solution polymerization method is preferred.

A polar organic solvent is preferably used as the solvent in the solution polymerization method. When the polar organic solvent is miscible with water, the polar organic solvent may be used as a mixture with water.

Polar organic solvents include, for example, aliphatic alcohols having 1 to 3 carbon atoms such as methanol, ethanol, and propanol; ketones such as acetone and methyl ethyl ketone; and esters such as ethyl acetate. Among them, methanol, ethanol, acetone, methyl ethyl ketone, or a mixed liquid composed of the above solvent with water is preferred.

Further, in the polymerization of monomer composition, a radical polymerization initiator may be used. Radical polymerization initiators include azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile); and organic peroxides such as t-butylperoxyoctoate, di-t-butylperoxide, and dibenzoyloxide.

The addition amount of the polymerization initiator per mole of monomer composition is preferably 0.001 to 5 moles, more preferably 0.01 to 2 moles.

In the polymerization of monomer composition, in addition to the radical polymerization initiator, a polymerization chain transfer agent may be added. Polymerization chain transfer agents usable herein include mercaptanes such as octylmercaptan, n-dodencylmercaptan, t-dodecylmercaptan, n-tetradecylmercaptan, and 2-mercaptoethanol; xanthogen disulfides such as dimethylxanthogen disulfide and diisopropylxanthogen disulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, turbinolene, α-terpinene, γ-terpinene, dipentene, α-methylstyrene dimmer, 9,10-dihydroanthracene, 1,4-dihydronaphthalene, indene, and 1,4-cyclohexadiene; and unsaturated heterocyclic compounds such as 2,5-dihydrofuran. These polymerization chain transfer agents may be used either solely or as a mixture of two or more.

Polymerization conditions for monomer composition vary depending, for example, upon radical polymerization initiators, monomers, and the type of solvents used. In general, the polymerization temperature is preferably 30 to 100° C., more preferably 50 to 80° C. The polymerization time is preferably 1 to 20 hr. The polymerization atmosphere is preferably an inert gas atmosphere such as nitrogen gas.

After the completion of the polymerization reaction, the produced vinyl polymer is isolated from the reaction solution by a conventional method such as reprecipitation from the reaction solution or removal of the solvent by evaporation. The vinyl polymer thus obtained may be purified by removing the unreacted monomer and the like, for example, by the repetition of reprecipitation, membrane separation, chromatography, or extraction.

Preparation of Magenta Solid Solution Pigment Dispersion Liquid

The magenta solid solution pigment dispersion liquid may be prepared, for example, by a method described in Japanese Patent Laid-Open No. 247810/2001. Specifically, a polymer solution dissolved in a water soluble organic solvent, a pigment, and optionally a neutralizing agent are mixed together to prepare a solvent dispersion liquid which is developed in an aqueous phase to prepare an aqueous suspension. Thereafter, the water soluble organic solvent added in the preparation of the solvent dispersion liquid is removed by distillation to cover the pigment with dispersant polymer particles.

The neutralizing agent may be properly determined, and alkalis usable as the neutralizing agent include tertiary amines such as trimethylamine and triethylamine, ammonia, sodium hydroxide, and potassium hydroxide. Acids usable as the neutralizing agent include inorganic bases such as hydrochloric acid and sulfuric acid and organic acids such as acetic acid, propionic acid, lactic acid, succinic acid, glycolic acid, glyconic acid, and glyceric acid.

Preferred organic solvents are water soluble organic solvents, and examples thereof include alcohols such as methanol, ethanol, and isopropanol, ketones such as acetone, methyl ethyl ketone, diethyl ketone, and methyl isobutyl ketone, and ethers such as dibutyl ether, tetrahydrofuran, and dioxane.

A dispergator may be used in the step of covering the pigment with the dispersant polymer. For example, the dispersion may be carried out with dispergators such as ball mills, sand mills, attritors, roll mills, agitator mills, Henschel mixers, colloid mills, ultrasonic homogenizers, jet mills, and Ong mills. More preferred are high-pressure homogenizers in which milling debrises of dispersing media and the like are less likely to be included.

The dispersant polymer particles thus obtained preferably have a diameter of about 25 to 250 nm. More preferably, the lower limit of the particle diameter is about 30 nm, and the upper limit of the particle diameter is about 175 nm.

The weight ratio of the magenta solid solution pigment to the dispersant polymer containing the pigment is preferably 5:95 to 95:5, more preferably 10:90 to 90:10. The addition amount of the pigment is preferably 0.5 to 15% by weight, more preferably 1 to 10% by weight, in terms of the weight of only the pigment, based on the total amount of the ink composition, in such as state that the pigment is covered with the dispersant polymer.

Vinyl Polymer

In a preferred embodiment of the present invention, the ink composition according to the present invention may comprise a vinyl polymer produced by copolymerizing a monomer composition comprising (1) a polyoxyalkylene group-containing monomer, (2) a salt forming group-containing polymer, and (3) a monomer copolymerizable with the polyoxyalkylene group-containing monomer and the salt forming group-containing monomer (hereinafter often referred to simply as a copolymerizable monomer). This polymer may be added in the preparation of the dispersion liquid of the magenta solid solution and the dispersant polymer, or alternatively may be added after the preparation of the dispersion liquid. Preferably, the polymer is added after the preparation of the dispersion liquid.

The composition ratio of the monomers is not particularly limited. The monomer composition preferably comprises (1) 5 to 50 parts by weight of the polyoxyalkylene group-containing monomer, (2) 3 to 40 parts by weight of the salt forming group-containing monomer, and (3) 15 to 90 parts by weight of the copolymerizable monomer.

(1) Polyoxyalkylene Group-Containing Monomer

The polyoxyalkylene group-containing monomer preferably comprises at least one monomer selected from the group consisting of monomer M1 represented by the following formula:

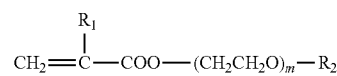

wherein $R^1$ represents a hydrogen atom or a methyl group; $R^2$ represents a hydrogen atom, an alkyl group having 1 to 20 carbon atoms or an alkylphenyl group having 1 to 9 carbon atoms; and m is a number of 1 to 30, monomer M2 represented by the following formula:

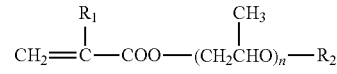

wherein $R^1$ represents a hydrogen atom or a methyl group; $R^2$ represents a hydrogen atom, an alkyl group having 1 to 20 carbon atoms or an alkylphenyl group having 1 to 9 carbon atoms; and n is a number of 1 to 30, and monomer M3 represented by the following formula:

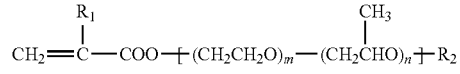

wherein $R^1$ represents a hydrogen atom or a methyl group; $R^2$ represents a hydrogen atom, an alkyl group having 1 to 20 carbon atoms or an alkylphenyl group having 1 to 9 carbon atoms; m and n are a number of 1 to 30; and the oxyethylene groups and the oxypropylene groups in [ ] are attached as a block polymer or a random polymer.

An ink composition having excellent gloss of printed images, ink storage stability, and recovery from clogging can be produced by using the water soluble monomer M1 as the polyoxyalkylene group-containing monomer. The reason for this has not been fully elucidated yet but it is considered that the excellent properties are based on spreading of a hydrophilic hydration layer of a highly hydrophilic oxyethylene group possessed by monomer M1 in the ink.

When monomer M2 is used as the polyoxyalkylene group-containing monomer, an ink composition having excellent ejection properties can be obtained. The reason for this has not been fully elucidated yet but it is considered that strong hydrophobic interaction occurs between the highly hydrophobic oxypropylene group of monomer M2 and the magenta solid solution pigment as the colorant and the vinyl polymer develops a high level of adsorption to the colorant, and, consequently, the hydrophobicity of the polymer particles containing the colorant is increased resulting in lowered viscosity of the ink composition.

Further, when monomer M3 is used as the polyoxyalkylene group-containing monomer, excellent dispersion stability can be imparted to the colorant. The reason for this has not been fully elucidated yet but is believed to reside in that the hydrophilic hydration layer of the highly hydrophilic oxyethylene group or oxytetramethylene group is spread in the ink.

In the above monomers M1 to M3, $R^1$ represents a hydrogen atom or a methyl group; and $R^2$ represents a hydrogen atom, an alkyl group having 1 to 20 carbon atoms, or an alkylphenyl group having 1 to 9 carbon atoms. $R^2$ preferably represents an octyl group or a nonyl phenyl group from the viewpoints of waterfastness and rubbing/scratch resistance.

m is a number of 1 to 30, and, from the viewpoint of ejection stability and print density, m is preferably 2 to 25. n is a number of 1 to 30, and, from the viewpoint of ejection stability and print density, n is preferably 2 to 25.

Polyethylene glycol mono(meth)acrylate and the like may be mentioned as monomer M1 represented by formula (I). Specific examples of monomer M1 as commercially available monomer M1 include: NK Ester M-20G, NK Ester M-40G, NK Ester M-90G, and NK Ester M-230G, manufactured by Shin-Nakamura Chemical Co., Ltd.; and Blemmer PE series, Blemmer PME-100, Blemmer PME-200, Blemmer PME-400, and Blemmer PME-1000, manufactured by Nippon Oils & Fats Co., Ltd.

Specific examples of monomer M2 represented by formula (II) include polypropylene glycol mono(meth)acrylate.

Specific examples of monomer M3 represented by formula (III) include ethylene glycol/propylene glycol(meth)acrylate, poly(ethylene glycol/propylene glycol) mono(meth)acrylate, octoxy polyethylene glycol/polypropylene glycol mono (meth)acrylate, octoxy poly(ethylene glycol/propylene glycol) mono(meth)acrylate, stearoxy polyethylene glycol/polypropylene glycol mono(meth)acrylate, stearoxy poly(ethylene glycol/propylene glycol) mono(meth)acrylate, nonylphenoxy polyethylene glycol/polypropylene glycol mono(meth)acrylate, and nonylphenoxy poly(ethylene glycol/propylene glycol) mono(meth)acrylate. They may be used either solely or as a mixture of two or more.

Among them, monomers M2 and M3 are preferably polypropylene glycol mono(meth)acrylate, ethylene glycol/propylene glycol(meth)acrylate, or poly(ethylene glycol/propylene glycol) mono(meth)acrylate from the viewpoints of ink viscosity and ejection stability.

Commercially available monomers M2 and M3, include, for example, Blemmer PP-1000, Blemmer PP-500, Blemmer PP-800, Blemmer AP-150, Blemmer AP-400, Blemmer AP-550, Blemmer AP-800, Blemmer 50 PEP-300, Blemmer 70 PEP-350B, Blemmer AEP series, Blemmer 30 PPT-800, Blemmer 50 PPT-800, Blemmer 70 PPT-800, Blemmer APT series, Blemmer 10 PPB-500B, Blemmer 10 APB-500B, Blemmer 50 POEP-800B, Blemmer 50 AOEP-800B, Blemmer ASEP series, Blemmer PNEP series, Blemmer PNPE series, Blemmer 43 ANEP-500, and Blemmer 70 ANEP-550, manufactured by Nippon Oils & Fats Co., Ltd.

The content of the polyoxyalkylene group-containing monomer in the water insoluble polymer is preferably 5 to 50% by weight, more preferably 10 to 40% by weight, from the viewpoints of improving the ejection stability of the ink composition and the gloss of the printed image and suppressing the lowering of the color developing property and fixation on gloss paper.

(2) Salt Forming Group-Containing Monomer

Preferred salt forming group-containing monomers are anionic monomers and cationic monomers. The anionic monomers and the cationic monomers may be used either solely or as a mixture of two or more.

At least one monomer selected from the group consisting of unsaturated carboxylic acid monomers, unsaturated sulfonic acid monomers, and unsaturated phosphoric acid monomers may be mantioned as the anionic monomer.

Unsaturated carboxylic acid monomers include, for example, acrylic acid, methacrylic acid, crotonic acid, itaconic acid, maleic acid, fumaric acid, citraconic acid, and 2-methacryloyloxymethylsuccinic acid. They may be used either solely or as a mixture of two or more.

Unsaturated sulfonic acid monomers include, for example, styrenesulfonic acid, 2-acrylamido-2-methylpropane-sulfonic acid, 3-sulfopropyl(meth)acrylate, and bis-(3-sulfopropyl)itaconate. They may be used either solely or as a mixture of two or more.

Unsaturated phosphoric acid monomers include, for example, vinylphosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate. They may be used either solely or as a mixture of two or more.

Among the anionic monomers, unsaturated carboxylic acid monomers are preferred from the viewpoints of ink viscosity and ejection stability, and acrylic acid and methacrylic acid are more preferred.

At least one monomer selected from the group consisting of unsaturated tertiary amine-containing vinyl monomers and unsaturated ammonium salt-containing vinyl monomer may be mentioned as the cationic monomer.

Unsaturated tertiary amine-containing monomers include, for example, N,N-dimethylaminoethyl(meth)acrylate, N,N-dimethylaminopropyl(meth)acrylate, N,N-diethylaminoethyl(meth)acrylate, N,N-dimethylaminopropyl(meth)acrylamide, N,N-dimethylarylamine, vinylpyrrolidone, 2-vinylpyridine, 4-vinyl pyridine, 2-methyl-6-vinylpyridine, and 5-ethyl-2-vinylpyridine. They may be used either solely or as a mixture of two or more.

Unsaturated ammonium salt-containing monomers include, for example, quaternalized N,N-dimethylaminoethyl(meth)acrylate, quaternalized N,N-diethylaminoethyl (meth)acrylate, and quaternalized N,N-dimethylaminopropyl(meth)acrylate. They may be used either solely or as a mixture of two or more.

Among the cationic monomers, N,N-dimethylaminoethyl (meth)acrylate, N,N-dimethylaminopropyl(meth)acrylamide, and vinylpyrrolidone are preferred.

The content of the salt forming group-containing monomer in vinyl polymer is preferably 3 to 40% by weight, more preferably 5 to 30% by weight, from the viewpoints of dispersion stability and ejection stability.

(3) Copolymerizable Monomer

Monomers copolymerizable with the polyoxyalkylene group-containing monomer and the salt forming group-containing monomer include, for example, higher alkyl group-containing monomers, aromatic ring-containing monomers, macromers, and (meth)acrylic esters. Among them, one or more of higher alkyl group-containing monomers, aromatic ring-containing monomers, and macromers are preferably used. The monomer copolymerizable with the polyoxyalkylene group-containing monomer and the salt forming group-containing monomer can suppress a change in viscosity of the ink caused by a wetting agent and a dispersant added in the preparation of the ink. Further, the storage stability of the ink can be enhanced. They may be used either solely or as a mixture of two or more.

In the higher alkyl group-containing monomer, the number of carbon atoms of the higher alkyl group is preferably 16 to 30, more preferably 18 to 22 from the viewpoint of, because they are easily available. For example, compounds represented by the following formula may be mentioned as representative examples of the higher alkyl group-containing monomer, wherein $R^1$ represents a hydrogen atom or a lower alkyl group having 1 to 4 carbon atoms; $R^2$ represents a hydrocarbon group optionally having a hetero atom and having 16 to 30 carbon atoms.

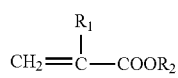

In the above formula, preferably, $R^2$ represents an optionally heteroatom-containing monovalent hydrocarbon group having 18 to 30 carbon atoms, more preferably 18 to 22 carbon atoms.

Specific examples of higher alkyl group-containing monomers include (meth)acrylic esters such as (iso)cetyl(meth) acrylate, (iso)stearyl(meth)acrylate, and (iso)behenyl(meth) acrylate. They may be used either solely or as a mixture of two or more. Among them, (iso)stearyl(meth)acrylate and/or (iso) behenyl(meth)acrylate are particularly preferred. When the higher alkyl group-containing monomer is used, a change in viscosity of the ink caused by a wetting agent or a dispersant added in the preparation of the ink can be advantageously suppressed to satisfactorily improve the storage stability. In this case, the total amount of stearyl(meth)acrylate and behenyl(meth)acrylate in the monomer mixture is preferably 5 to 50% by weight, more preferably 10 to 30% by weight, from the viewpoints of suppressing a change in ink viscosity and satisfactorily enhancing storage stability.

The aromatic ring-containing monomer is preferably at least one monomer selected from the group consisting of styrene, vinylnaphthalene, α-methylstyrene, vinyltoluene, ethyl vinylbenzene, 4-vinyl biphenyl, 1,1-diphenylethylene, benzyl(meth)acrylate, phenoxyethyl(meth)acrylate, 2-hydroxy-3-phenoxypropyl acrylate, 2-methacryloyloxyethyl-2-hydroxypropyl phthalate, 2-acryloyloxyethylphthalic acid, and neopentyl glycol acrylate benzoate from the viewpoint of imparting waterfastness. Among them, one or more monomers selected from the group consisting of styrene, α-methylstyrene, vinyltoluene, and vinylnaphthalene is more preferred from the viewpoints of waterfastness and scratch/rubbing resistance.

(Meth)acrylic esters include, for example, (meth)acrylic esters in which the ester part is an alkyl group having 1 to 18 carbon atoms, for example, methyl(meth)acrylate, ethyl (meth)acrylate, (iso)propyl(meth)acrylate, (iso or tertiary) butyl(meth)acrylate, (iso)amyl(meth)acrylate, cyclohexyl (meth)acrylate, benzyl(meth)acrylate, 2-ethylhexyl(meth) acrylate, (iso)octyl(meth)acrylate, (iso)decyl(meth)acrylate, (iso)dodecyl(meth)acrylate, and (iso)stearyl(meth)acrylate. They may be used either solely or as a mixture of two or more.

An example of the macromer as one of the copolymerizable monomers is a macromer having a polymerizable functional group at its one end and preferably having a number average molecular weight of 500 to 500,000, more preferably 1,000 to 10,000.

Specific examples of macromers include styrenic macromers having a polymerizable functional group at one end thereof, silicone macromers having a polymerizable functional group at one end thereof, methyl methacrylate macromers having a polymerizable functional group at one end thereof, styrene-acrylonitrile macromers having a polymerizable functional group at one end thereof, butyl acrylate macromers having a polymerizable functional group at one end thereof, and isobutyl methacrylate macromers having a polymerizable functional group at one end thereof. Among them, styrenic macromers having a polymerizable functional group at one end thereof are preferred from the viewpoint of satisfactorily incorporating the colorant into the vinyl polymer.

A styrene homopolymer having a polymerizable functional group at its one end and a copolymer of styrene with another monomer having a polymerizable functional group at its one end may be mentioned as the styrenic macromer containing a polymerizable functional group on its one end.

In the copolymer of styrene with another monomer having a polymerizable functional group at its one end, examples of another monomers include acrylonitrile. The content of styrene is preferably not less than 60% by weight, more preferably not less than 70% by weight, from the viewpoint of satisfactorily incorporating the pigment in the vinyl polymer.

Among styrenic macromers having a polymerizable functional group at one end thereof, those having an acryloyl or methacryloyl group as the polymerizable functional group at one end thereof are preferred. Commercially available styrenic macromers include, for example, AS-6, AS-6S, AN-6, AN-6S, HS-6S, and HS-6, manufactured by TOAGOSEI Co., Ltd.

The number average molecular weight of the macromer is measured by gel chromatography using 1 mmol/L dodecyldimethylamine-containing chloroform as the solvent and polystyrene as a standard material.

The content of the macromer in the vinyl polymer is preferably 0.1 to 40% by weight, more preferably 1 to 30% by weight, from the viewpoints of waterfastness and scratch/rubbing resistance.

The use of the macromer as a monomer for constituting the vinyl polymer can realize the provision of an ink composition having excellent ejection properties. The reason for this has not been fully elucidated yet but is believed to reside in that the hydrophobic interaction between the highly hydrophobic macromer and the magenta solid solution pigment as the colorant is so strong that the vinyl polymer develops a high level of adsorption to the colorant and, thus, the hydrophobicity of the colorant-containing polymer particles is enhanced resulting in lowered viscosity of the water-based ink.

The content of the copolymerizable monomer in the vinyl polymer is 15 to 90% by weight, preferably 35 to 80% by weight, from the viewpoints of print density and waterfastness.

The vinyl polymer may be produced by mixing a predetermined amount of the polyoxyalkylene group-containing monomer (1), a predetermined amount of the salt forming group-containing monomer (2), and a predetermined amount of the copolymerizable monomer (3) together and copolymerizing them. The polymerization may be carried out by a conventional polymerization method such as a bulk polymerization method, a solution polymerization method, a suspension polymerization method, or an emulsion polymerization method. Among these polymerization methods, the solution polymerization method is preferred.

A polar organic solvent is preferably used as the solvent in the solution polymerization method. When the polar organic solvent is miscible with water, the polar organic solvent may be used as a mixture with water.

Polar organic solvents include, for example, aliphatic alcohols having 1 to 3 carbon atoms such as methanol, ethanol, propanol, and isopropyl alcohol; ketones such as acetone and methyl ethyl ketone; and esters such as ethyl acetate. Among them, methanol, ethanol, isopropyl alcohol, acetone, methyl ethyl ketone, or a mixed liquid composed of the above solvent with water is preferred.

In the polymerization, a radical polymerization initiator may be used. Suitable radical polymerization initiators include azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile), and 1,1'-azobis(1-cyclohexanecarbonitrile). Organic peroxides such as t-butylperoxyoctoate, di-t-butylperoxide, and dibenzoyloxide may also be used.

The addition amount of the polymerization initiator per mole of monomer composition is preferably 0.001 to 5 moles, more preferably 0.01 to 2 moles.

In the polymerization, in addition to the radical polymerization initiator, a polymerization chain transfer agent may be added. Specific examples of polymerization chain transfer agents usable herein include mercaptanes such as octylmercaptan, n-dodencylmercaptan, t-dodecylmercaptan, n-tetradecylmercaptan, and 2-mercaptoethanol; xanthogen disulfides such as dimethylxanthogen disulfide and diisopropylxanthogen disulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, turbinolene, α-terpinene, γ-terpinene, dipentene, α-methylstyrene dimmer, 9,10-dihydroanthracene, 1,4-dihydronaphthalene, indene, and 1,4-cyclohexadiene; and unsaturated heterocyclic compounds such as 2,5-dihydrofuran. These polymerization chain transfer agents may be used either solely or as a mixture of two or more.

Polymerization conditions for monomer composition vary depending, for example, upon radical polymerization initiators, monomers, and the type of solvents used. In general, the polymerization temperature is preferably 30 to 100° C., more preferably 50 to 80° C. The polymerization time is preferably 1 to 20 hr. The polymerization atmosphere is preferably an inert gas atmosphere such as nitrogen gas.

After the completion of the polymerization reaction, the produced vinyl polymer is isolated from the reaction solution by a conventional method such as reprecipitation from the reaction solution or removal of the solvent by evaporation. The vinyl polymer thus obtained may be purified by removing the unreacted monomer and the like, for example, by the repetition of reprecipitation, membrane separation, chromatography, or extraction.

The weight average molecular weight of the vinyl polymer is preferably 150,000 to 500,000. When the weight average molecular weight of the vinyl polymer is in the above-defined range, printing stability in continuous printing is improved. The average molecular weight of the polymer can be controlled by a conventional procedure in which a chain transfer material such as mercaptan is added.

The weight average molecular weight of the vinyl polymer may be determined by drying a part of the polymer solution under the reduced pressure at 150° C. for 2 hr, to remove the solvent to isolate the vinyl polymer, and subjecting the vinyl polymer to gel permeation chromatography using polystyrene as the standard substance and 60 mmol/L phosphoric acid and 50 mmol/L lithium bromide-containing dimethylformamide as the solvent.

In the present invention, the vinyl polymer is preferably present in the form of polymer particles in the ink. The polymer particles may be produced, for example, by adding a solvent such as methyl ethyl ketone to the polymer solution, adding an aqueous electrolyte solution such as potassium hydroxide thereto to neutralize the polymer salt forming group, adding ion exchanged water thereto, stirring the mixture, further carrying out stirring with a microfluidizer or the like, removing the organic solvent and water from the resultant emulsification product.

The average particle diameter of the vinyl polymer is preferably regulated to approximately 10 to 200 nm, more preferably 60 to 200 nm. When the average particle diameter is less than 10 nm, the recovery from clogging is deteriorated. On the other hand, when the average particle diameter exceeds 300 nm, the gloss on gloss paper is deteriorated. The diameter of the polymer particles may be measured by observation under an electron microscope, a coulter counter, or a light scattering method. For example, the measurement by the coulter counter can be carried out with Coulter Counter N4 (manufactured by Coulter Electronics K.K.), the measurement by the light scattering method can be carried out with a laser particle diameter analysis system LPA-3000/3100 (manufactured by Otsuka Electronics Co., Ltd.) or a laser diffraction-type particle size distribution measuring device SALD-2000A (manufactured by Shimadzu Seisakusho Ltd.).

The amount of the vinyl polymer particles added to the ink composition is preferably not less than 0.1% by weight from the viewpoint of the fixation and is preferably not more than 3.0% by weight, more preferably 0.2 to 2.0% by weight, from the viewpoint of preventing a deterioration in recovery from clogging.

Surfactant

In a preferred embodiment of the present invention, the ink composition according to the present invention comprises two compounds represented by formulae (a) and (b):

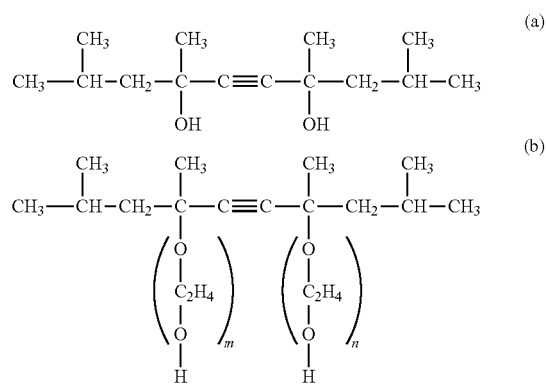

wherein m and n satisfy a requirement of m+n=10.

An improvement in recovery from clogging and ejection stability while improving color developing properties on plain papers can be realized by using the compound having a low balance (HLB) value between hydrophilicity and lipophilicity (compound of formula (a)) and the compound having a high HLB value (compound of formula (b)) in combination at a weight ratio of 2:1 to 1:4, preferably 5:7 to 5:13.

In the present invention, the incorporation of the compound having a low HLB value (compound of formula (a)) and the compound having a high HLB value (compound of formula (b)) at a predetermined ratio in the ink composition can simultaneously realize an improvement in color developing properties on plain papers and an improvement in recovery from clogging and ejection stability.

The total addition amount of the compound of formula (a) and the compound of formula (b) may be properly determined. Preferably, however, the total amount of the compound of formula (a) and the compound of formula (b) added to the ink composition is preferably 0.03 to 5% by weight, more preferably 0.3 to 3% by weight.

The compound of formula (a) may be a commercially available product, and specific examples thereof include Olfine STG (manufactured by Nissin Chemical Industry Co., Ltd.) and Surfynol 104 (manufactured by Air Products and Chemicals, Inc.).

The compound of formula (b) may be a commercially available product, and examples thereof include Surfynol 400 series (manufactured by Air Products and Chemicals, Inc.) and Olfine E1010 (manufactured by Nissin Chemical Industry Co., Ltd.).

Water and Other Components

Water

The ink composition according to the present invention comprises water as a main solvent. Water may be pure water or ultrapure water obtained by ion exchange, ultrafiltration, reverse osmosis, distillation or the like. Water, which has been sterilized, for example, by ultraviolet irradiation or by addition of hydrogen peroxide, is preferred, because this treatment can prevent the growth of mold or bacteria and, thus, the ink composition can be stored for a long period of time.

pH Adjustor

Preferably, the ink composition according to the present invention further comprises a pH adjuster. Specific examples of pH adjustors include: hydroxides of alkali metals such as lithium hydroxide, potassium hydroxide, sodium hydroxide and amines such as ammonia, triethanolamine, tripropanolamine, diethanolamine, and monoethanolamine. More preferably, the pH adjustor is selected from the group consisting of triethanolamine, tripropanolamine, and a mixture of triethanolamine with tripropanolamine.

In the present invention, the pH value of the ink composition is preferably 8.0 to 11. Better gloss can be realized by adjusting the ink composition to the above-defined pH range. The use of the above pH adjustor is advantageously for the adjustment of the ink composition to the above-defined pH range.

Water Soluble Organic Solvent

The ink composition according to the present invention preferably further comprises a water soluble organic solvent. The water soluble organic solvent functions mainly as a penetrating agent, a humectant, a viscosity modifier and the like of the ink composition.

Specific examples of water soluble organic solvents include monohydric alcohols such as methanol, ethanol, n-propanol, iso-propanol, n-butanol, sec-butanol, tert-butanol, iso-butanol, and n-pentanol, and glycol monoalkyl ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether.

In a preferred embodiment of the present invention, the ink composition comprises a component selected from water soluble polyols, glycol-type butyl ether, pyrrolidone, and mixtures thereof. Among them, a combination of a water soluble polyol, a glycol-type butyl ether, and pyrrolidone is more preferred. The incorporation of the combination can realized a further improvement in ink reliability of the ink composition, for example, print quality, ejection stability, and recovery from clogging.

Specific examples of water soluble polyols include ethylene glycol, diethylene glycol, triethylene glycol, tetraethylene glycol, propylene glycol, dipropylene glycol, tripropylene glycol, polyethylene glycol, 1,3-propylene glycol, 1,3-butanediol, 1,5-pentanediol, 1,6-hexanediol, glycerin, metherythritol, pentaerythritol, thiodiglycol, trimethylolpropane, trimethylolpropane, and pentaerythritol. Among them, diethylene glycol, triethylene glycol, 1,5-pentanediol, glycerin, and trimethylolpropane are preferred. These water soluble polyols may be used either solely or as a mixture of two or more.

An example of a preferred glycol-type butyl ether is a ether selected, for example, from ethylene glycol mono-n-butyl ether, diethylene glycol mono-n-butyl ether, triethylene glycol mono-n-butyl ether, propylene glycol mono-n-butyl ether, or dipropylene glycol mono-n-butyl ether. Among them, ethylene glycol mono-n-butyl ether and triethylene glycol mono-n-butyl ether are preferred. These glycol-type butyl ethers may be used either solely or as a mixture of two or more.

The addition amount of the water soluble organic solvent is preferably 0.25 to 15% by weight, more preferably 0.5 to 10% by weight, based on the total amount of the ink.

1,2-Alkanediol

In the present invention, preferably, the ink composition further comprises an 1,2-alkanediol.

The 1,2-alkanediol is preferably selected from the group consisting of 1,2-alkanediols having 4 to 10 carbon atoms. In this case, a mixture of a plurality of 1,2-alkanediols may be added.

In a preferred embodiment of the present invention, the 1,2-alkanediol is selected from the group consisting of 1,2-butanediol, 1,2-pentanediol, 1,2-hexanediol, 1,2-heptenediol, and mixtures thereof. They are advantageous because of their excellent penetration into the recording medium.

In a more preferred embodiment of the present invention, the 1,2-alkanediol is preferably 1,2-hexanediol or 1,2-pentanediol, more preferably 1,2-hexanediol.

The addition amount of the 1,2-alkanediol is preferably not less than 0.25% by weight and not more than 15% by weight based on the total amount of the ink composition. More preferably, the upper limit of the addition amount of the 1,2-alkanediol is 10% by weight, and the lower limit of the addition amount of the 1,2-alkanediol is 0.5% by weight.

Other Components

In a preferred embodiment of the present invention, the ink composition preferably contains polyols from the viewpoint of preventing nozzle clogging of an ink jet recording head. Preferred polyols include water soluble polyols, and examples thereof include ethylene glycol, diethylene glycol, triethylene glycol, tetraethylene glycol, propylene glycol, dipropylene glycol, tripropylene glycol, polyethylene glycol, 1,3-propylene glycol, isopropylene glycol, isobutylene glycol, 1,4-butanediol, 1,3-butanediol, 1,5-pentanediol, 1,6-hexanediol, glycerin, metherythritol, pentaerythritol, thiodiglycol, trimethylolpropane, trimethylolethane, 1,2,6-hexantriol, trimethylolethane, trimethylolpropane, and pentaerythritol.

Further, lactams such as 2-pyrrolidone, N-methyl-2-pyrrolidone, and 6-caprolactam, and ureas such as urea, thiourea, ethyleneurea, and 1,3-dimethylimidazolidinone may also be used. Furthermore, for example, glucose, mannose, fructose, ribose, xylose, arabinose, galactose, aldonic acid, glucitol, (sorbit), maltose, cellobiose, lactose, sucrose, trehalose, and maltotriose may be added as monosaccharides, disaccharides, oligosaccharides, and polysaccharides. Further, derivatives of these saccharides may also be used. For example, reducing sugars, oxidizing sugars, amino acids, and thiosugars may also be used. Among them, sugar alcohols are particularly preferred, and specific examples thereof include maltitol and sorbit. Commercially available products, for example, HS-500 and HS-300 manufactured by Hayashibara Biochemical Laboratories, Inc., may also be used. They may be used either solely or as a mixture of two or more.

The addition amount of the clogging preventive component is preferably not less than 5% by weight and not more than 40% by weight based on the total amount of the ink composition. More preferably, the upper limit of the addition amount of the clogging preventive component is 30% by weight, and the lower limit of the addition amount of the clogging preventive component is 10% by weight.

Further, these components in combination with other ink additives is preferably added in such an amount that bring the ink viscosity to not more than 25 cPs at 25° C.

The ink composition according to the present invention may if necessary contain pH buffers, antioxidants, ultraviolet absorbers, preservatives or fungicides, chelating agents and the like.

Specific examples of pH adjustors include collidine, imidazole, phosphoric acid, 3-(N-morpholino)propanesulfonic acid, tris(hydroxymethyl)aminomethane, and boric acid.

Specific examples of antioxidants or ultraviolet absorbers include allophanates such as allophanate and methyl allophanate, biurets such as biuret, dimethylbiuret and tetramethylbiuret, L-ascorbic acid and its salts, Tinuvin328, Tinuvin900, Tinuvin1130, Tinuvin384, Tinuvin292, Tinuvin123, Tinuvin144, Tinuvin622, Tinuvin770, Tinuvin292, Irgacor252, Irgacor153, Irganox1010, Irganox1076, Irganox1035, and MD1024 (manufactured by CIBA-GEIGY Ltd.), or lanthanide oxides.

Specific examples of preservatives or fungicides include sodium benzoate, sodium pentachlorophenolate, sodium 2-pyridinethiol-1-oxide, sodium sorbate, sodium dehydroacetic acid, and 1,2-dibenzothiazolin-3-one (ProxelCRL, ProxelBDN, ProxelGXL, ProxelXL-2, and ProxelTN, manufactured by Avecia). Specific examples of chelating agents include ethylenediaminetetraacetic acid (EDTA).

Preparation of Ink Composition

The ink composition according to the present invention may be prepared by supplying the above components into a dispersing/mixing machine (for example, a ball mill, a sand mill, an attritor, a basket mill, or a roll mill) and dispersing the mixture. In a preferred embodiment of the present invention, the ink stock solution thus prepared by the dispersing/mixing machine is filtered, for example, through a membrane filter or a mesh filter to remove coarse particles.

Ink Jet Recording Method and Apparatus

The ink jet recording method in which the ink composition according to the present invention is used, comprises ejecting droplets of an ink composition and depositing the droplets onto a heated recording medium to perform printing. Examples of methods for ejecting droplets of the ink composition include a method wherein an electric signal is converted to a mechanical signal using an electrostrictive element to intermittently eject ink reservoired in a nozzle head section, thereby recording letters or symbols on the surface of a recording medium, and a method wherein ink, reservoired in a nozzle head section, in its portion very close to the ejection portion is rapidly heated to create a bubble and the ink are intermittently ejected by volume expansion created by the bubble to record letters or symbols on the surface of a recording medium. In a preferred embodiment of the present invention, the ink composition according to the present invention is preferably used in ink jet recording using an electrostrictive element. The ejection of droplets of the ink composition is preferably carried out by a recording head through which ink droplets are ejected by taking advantage of the dyanamical action of the piezoelectric element.

Further, according to the present invention, there is also provided a recorded matter recoded by the above recording method.

EXAMPLES

The present invention is further illustrated by the following Examples that are not intended as a limitation of the invention.

Preparation of Magenta Solid Solution Pigment (a)

A crude pigment of C.I. Pigment Violet 19 (10 parts), 100 parts of sodium chloride, and 1 part of a high-boiling point alicyclic hydrocarbon are charged into a ball mill, and the mixture was milled for 10 hr. Subsequently, the milled mixture was subjected to post treatments such as pigment formation, filtration, and washing according to the conventional method to provide a pressed cake having a solid content of 30% by weight.

A crude pigment of C.I. Pigment Red 209 (10 parts), 100 parts of sodium chloride, and 1 part of a high-boiling point alicyclic hydrocarbon are charged into a ball mill, and the mixture was milled for 10 hr. Subsequently, the milled mixture was subjected to post treatments such as pigment formation, filtration, and washing according to the conventional method to provide a pressed cake having a solid content of 30% by weight.

Next, the solid matter of the pressed cake of C.I. Pigment Violet 19 (2 parts) and the solid matter of the pressed cake of C.I. Pigment Red 209 (8 parts) were added, and the mixture was milled, and the solid solution pigment was converted to a pigment by organic solvent treatment, followed by filtration, washing, drying and grinding to prepare a solid solution pigment of C.I. Pigment Violet 19/C.I. Pigment Red 209 (weight ratio: 3/1). The hue was a magenta color. The produced solid solution pigment had an average particle diameter of not more than 200 nm.

Preparation of Magenta Solid Solution Pigment (b)

A crude pigment of C.I. Pigment Violet 19 (10 parts), 100 parts of sodium chloride, and 1 part of a high-boiling point alicyclic hydrocarbon are charged into a ball mill, and the mixture was milled for 10 hr. Subsequently, the milled mixture was subjected to post treatments such as pigment formation, filtration, and washing according to the conventional method to provide a pressed cake having a solid content of 30% by weight.

A crude pigment of C.I. Pigment Red 122 (10 parts), 100 parts of sodium chloride, and 1 part of a high-boiling point alicyclic hydrocarbon are charged into a ball mill, and the mixture was milled for 10 hr. Subsequently, the milled mixture was subjected to post treatments such as pigment formation, filtration, and washing according to the conventional method to provide a pressed cake having a solid content of 30% by weight.

Next, the solid matter of the pressed cake of C.I. Pigment Violet 19 (7.5 parts) and the solid matter of the pressed cake of C.I. Pigment Red 122 (2.5 parts) were added, and the mixture was milled, and the solid solution pigment was converted to a pigment by organic solvent treatment, followed by filtration, washing, drying and grinding to prepare a solid solution pigment of C.I. Pigment Violet 19/C.I. Pigment Red 122 (weight ratio: 3/1). The hue was a magenta color. The produced solid solution pigment had an average particle diameter of not more than 200 nm.

Preparation of Magenta Solid Solution Pigment (c)

Magenta solid solution pigment (c) was produced in the same manner as in magenta solid solution pigment (b), except that the weight ratio between C.I. Pigment Red 19 and C.I. Pigment Red 122 is 1:1. The hue was a magenta color, and the average particle diameter was not more than 200 nm.

Preparation of Magenta Solid Solution Pigment (d)

Magenta solid solution pigment (d) was produced in the same manner as in magenta solid solution pigment (b), except that the weight ratio between C.I. Pigment Red 19 and C.I. Pigment Red 122 is 2:8. The hue was a magenta color, and the average particle diameter was not more than 200 nm.

Preparation of Dispersant Polymer

Methyl ethyl ketone (20 parts by weight), 0.03 part by weight of a polymerization chain transfer agent (2-mercaptanethanol), and 10% by weight in total of the monomers specified in Table 1 below were charged into a reaction vessel and were mixed together. Thereafter, the air in the vessel was replaced by nitrogen gas. On the other hand, the remaining 90% by weight of the monomer composition was charged into a dropping device.

A polymerization chain transfer agent (2-mercaptanethanol) (0.27 part by weight), 60 parts by weight of methyl ethyl ketone, and 1.2 parts by weight of 2,2'-azobis(2,4-dimethylvaleronitrile) are then added to the dropping device, followed by mixing. Thereafter, the air in the dropping device was replaced by nitrogen gas.

Under a nitrogen atmosphere, the mixed solution within the reaction vessel was heated to 65° C. with stirring, and the mixed solution in the dropping device was gradually added dropwise to the contents of the reaction vessel over a period of hr. After the completion of the dropwise addition, the temperature of the mixed solution was maintained at 65° C. for 2 hr. A solution of 0.3 part by weight of 2,2'-azobis(2,4-dimethylvaleronitrile) dissolved in 5 parts by weight of methyl ethyl ketone was added to the mixed solution, and the mixture was ripened at 65° C. for 2 hr and at 70° C. for 2 hr to prepare a polymer solution.

A part of the polymer solution thus obtained was provide, and the solvent was removed by distillation under the reduced pressure for drying for isolation to give polymer particles.

The weight average molecular weight was determined by gel permeation chromatography using polystyrene as a standard substance and 60 mmol/L phosphoric acid and 50 mmol/L lithium bromide-containing dimethylformamide as a solvent and was found to be 70,000.

TABLE 1

| | Addition amount (wt %) | | |
|---|---|---|---|
| Monomer | A | B | C |
| Polypropylene glycol monomethacrylate (n = 9) | 0 | 15 | 15 |
| Poly(ethylene glycol/propylene glycol) monomethacrylate | 0 | 0 | 8 |
| Methacrylic acid | 22 | 14 | 14 |
| Styrene monomer | 63 | 48 | 48 |
| Styrene macromer | 15 | 15 | 15 |
| n-Butyl methacrylate | 0 | 0 | 0 |
| n-Butyl acrylate | 0 | 0 | 0 |
| Stearyl methacrylate | 0 | 8 | 0 |
| Degree of neutralization (%) | 60 | 60 | 60 |

Polypropylene glycol monomethacrylate (n=9): tradename: Blemmer PP-500, manufactured by Nippon Oils & Fats Co., Ltd.

Styrene macromer: tradename: AS-6S (styrene macromer), manufactured by TOAGOSEI Co., Ltd., number average molecular weight: 6000, polymerizable functional group: methacryloyl group.

Poly(ethylene glycol/propylene glycol) monomethacrylate: tradename: Blemmer 50PEP-300, manufactured by Nippon Oils & Fats Co., Ltd.

Preparation of Pigment Dispersion Liquids 1 to 6

TABLE 2

| Pigment dispersion liquid | Magenta solid solution pigment | Dispersant polymer |
|---|---|---|
| 1 | (a) | A |
| 2 | (a) | B |
| 3 | (a) | C |
| 4 | (b) | C |
| 5 | (c) | C |
| 6 | (d) | C |

As described above, the magenta solid solution pigment was used in combination with the dispersant polymer to prepare a pigment dispersion liquid. The vinyl polymer (5 parts by weight) was dissolved in 45 parts by weight of methyl ethyl ketone. A predetermined amount (specified in Table 1) of a neutralizing agent (a 20% aqueous sodium hydroxide solution) was added to the solution to neutralize the salt forming group. The magenta solid solution pigment prepared above (20 parts by weight) was then added, and the mixture was kneaded with a bead mill for 2 hr.

Ion-exchanged water (120 parts by weight) was added to the kneaded product prepared above, and the mixture was stirred. Methyl ethyl ketone was removed under the reduced pressure at 60° C. Further, a part of water was removed. Thus, pigment dispersion liquids 1 to 6 having a solid content of 20% by weight were prepared. The average particle diameter of the polymer particles in the pigment dispersion liquid was measured with Coulter Counter N4 (manufactured by Coulter Electronics) and, for all the pigment dispersion liquids, was found to be 100 nm.

Preparation of Ink Compositions

Examples 1 to 7

The components were mixed together according to the formulations specified in Table 2 below, and the mixture was stirred for 2 hr. Subsequently, the stirred mixture was filtered through Membrane Filter (tradename, manufactured by NIHON MILLIPORE, LTD.) having a pore diameter of about 8 μm. Thus, magenta inks were prepared. In Table 2, the addition amount of each composition is in % by weight.

On the other hand, the remaining 90% by weight of the amount (parts by weight) of each monomer specified in the table below was charged into a dropping funnel. Next, a polymerization chain transfer agent (2-mercaptoethanol) in an amount specified in the table, 60 parts by weight of methyl ethyl ketone and 1.2 parts by weight of 2,2'-azobis(2,4-dimethylvaleronitrile) were added to and mixed with the solution in the dropping funnel, followed by thorough replacement of the air in the dropping funnel by nitrogen gas. Thus, three types of mixture liquids were produced.

Under a nitrogen atmosphere, the mixed solution within the reaction vessel was heated to 65° C. with stirring, and the mixed solution in the dropping funnel was gradually added dropwise to the contents of the reaction vessel over a period of hr. After the completion of the dropwise addition, the temperature of the mixed solution was maintained at 65° C. for 2 hr. A solution of 0.3 part by weight of 2,2'-azobis(2,4-dimethylvaleronitrile) dissolved in 5 parts by weight of methyl ethyl ketone was added to the mixed solution, and the mixture

TABLE 3

| Composition | | 1 | 2 | 3 | 4 | 5 | 6 | 7 |
|---|---|---|---|---|---|---|---|---|
| | | \multicolumn{7}{c}{Example} |
| | | \multicolumn{7}{c}{Addition amount (wt %)} |
| Pigment dispersion liquid | 1 | 40 | 40 | 40 | — | — | — | — |
| | 2 | — | — | — | 40 | — | — | — |
| | 3 | — | — | — | — | 40 | — | — |
| | 4 | — | — | — | — | — | 40 | — |
| | 5 | — | — | — | — | — | — | 40 |
| Trimethylolpropane | | 5 | 5 | 5 | 5 | 5 | 5 | 5 |
| Glycerin | | 5 | 5 | 5 | 5 | 5 | 5 | 5 |
| Triethylene glycol | | 10 | 10 | 10 | 10 | 10 | 10 | 10 |
| TEGmBE | | 2 | 2 | 2 | 2 | 2 | 2 | 2 |
| 1,2-Hexanediol | | 3 | 3 | 3 | 3 | 3 | 3 | 3 |
| Olfine E1010 | | 0.6 | 0.4 | 0.9 | 0.7 | 0.6 | 0.6 | 0.6 |
| Surfynol 104 | | 0.3 | 0.9 | 0.2 | 0.3 | 0.4 | 0.3 | 0.3 |
| Emulgen 120 | | — | — | — | — | — | — | — |
| Emulgen 408 | | — | — | — | — | — | — | — |
| 2-Methylpyrrolidone | | 2 | 2 | 2 | 2 | 2 | 2 | 2 |
| Triethanolamine | | 1 | 1 | 1 | 1 | 1 | 1 | 1 |
| Ultrapure water | | Balance | Balance | Balance | Balance | Balance | Balance | Balance |

In the table, TEGmBE represents triethylene glycol monobutyl ether
Emulgen 120 (manufactured by Kao Corp.) is a surfactant which is polyoxyethylene lauryl ether and has an HLB value substantially equal to Olfine E1010.
Emulgen 480 (manufactured by Kao Corp.) is a surfactant which is polyoxyethylene oleyl ether and has an HLB value substantially equal to Surfynol 104.

Preparation of Vinyl Polymer

Methyl ethyl ketone (20 parts by weight), 10% by weight of the amount (parts by weight) of each monomer of Preparations 1 to 3 specified in the table below, and 2-mercaptoethanol (polymerization chain transfer agent) in an amount shown in the table below were placed and were mixed together in a reaction vessel, followed by thorough replacement of the air in the reaction vessel by nitrogen gas to prepare a mixed solution. Thus, three types of mixture liquids were prepared.

was ripened at 65° C. for 2 hr and at 70° C. for 2 hr. Thus, polymer solutions of Preparations 1 to 3 were produced.

A part of each polymer solution of Preparations 1 to 3 thus obtained was dried under the reduced pressure at 105° C. for 2 hr to remove the solvent for isolation of the polymer. The weight average molecular weight of the polymer was determined by gel-permeation chromatography using polystyrene as a standard substance, and 60 mmol/L of phosphoric acid and 50 mmol/L of lithium bromide-containing dimethylformamide as solvents.

TABLE 4

| | | Preparation No.. | | |
|---|---|---|---|---|
| Starting materials for polymer synthesis | | 1 | 2 | 3 |
| Monomer | Polyethylene glycol monomethacrylate (m = 23) | 0 | 8 | 8 |
| | Polypropylene glycol monomethacrylate (n = 9) | 15 | 15 | 15 |

TABLE 4-continued

| | | Preparation No. | | |
|---|---|---|---|---|
| Starting materials for polymer synthesis | | 1 | 2 | 3 |
| | Poly(ethylene glycol/propylene glycol) monomethacrylate | 8 | 0 | 0 |
| | Methacrylic acid | 14 | 14 | 14 |
| | Styrene monomer | 48 | 48 | 48 |
| | Styrene macromer | 15 | 15 | 15 |
| | Stearyl methacrylate | 0 | 0 | 0 |
| Z-Mercaptoethanol (polymerization chain transfer agent) | Within reaction vessel | 0.030 | 0.030 | 0.010 |
| | Within dropping funnel | 0.270 | 0.270 | 0.100 |
| Weight average molecular weight of polymer | | 60,000 | 60,000 | 250,000 |

The detail of main starting compounds specified in the table are as follows.

Polyethylene glycol monomethacrylate (m=23): tradename; NK ester M230G, manufactured by Shin-Nakamura Chemical Co., Ltd.; a compound represented by formula (I) wherein m is 23 and $R^1$ and $R^2$ represent a methyl group.

Polypropylene glycol monomethacrylate (n=9): tradename; Blemmer PP-500, manufactured by Nippon Oils & Fats Co., Ltd.; a compound represented by formula (II) wherein n is 9, $R^1$ represents a methyl group, and $R^2$ represents a hydrogen atom.

Poly(ethylene glycol/propylene glycol) monomethacrylate: tradename; Blemmer 50PEP-300, manufactured by Nippon Oils & Fats Co., Ltd.; a monomer represented by formula (III) wherein m is 3.5, n is 2.5, $R^1$ represents a methyl group, $R^2$ represents hydrogen, and oxypropylene groups and oxyethylene groups are added to each other randomly.

Styrene macromer: tradename; AS-6S (styrene macromer), manufactured by TOAGOSEI Co., Ltd., number average molecular weight: 6000, polymerizable functional group: methacryloyl group.

Preparation of Vinyl Polymer Particles

Methyl ethyl ketone (64.0 parts by weight) was added to 14.0 parts by weight of the polymer obtained by drying each polymer solution of Preparations 1 to 3 synthesized above in vacuo. A predetermined amount of a 1 mol/L aqueous potassium hydroxide solution was added thereto to neutralize the salt forming group of the polymer to a degree of neutralization of 70% and thus to provide a degree of neutralization (60%) specified in Table 1 above. Ion exchanged water (200 parts by weight) was added thereto, and the mixture was stirred, followed by emulsification with Microfluidizer (tradename, manufactured by Microfluidics) for 20 min.

An organic solvent was removed from each emulsion thus obtained under the reduced pressure at 60° C., and water was further removed for concentration to give polymer particles 1 to 3 having a solid content of 20% by weight. The average particle diameter of polymer particles 1 to 3 thus obtained was measured with Coulter Counter N4 (tradename, manufactured by Coulter Electronics) and was found to be 110 nm.

Production of Ink Compositions

Examples 8 to 10

The components were mixed together according to the formulations specified in the table below, and the mixture was stirred for 2 hr. Subsequently, the stirred mixture was filtered through Membrane Filter (tradename, manufactured by NIHON MILLIPORE, LTD.) having a pore diameter of about 8 μm. Thus, magenta inks of Examples 8 to 10 were prepared. In the table, the addition amount of each composition is in % by weight.

TABLE 5

| | | Example | | |
|---|---|---|---|---|
| | | 8 | 9 | 10 |
| Composition | | Addition amount (wt %) | | |
| Pigment | 3 | 40 | — | — |
| dispersion liquid | 6 | — | 40 | 40 |
| Vinyl polymer | 1 | 2.5 | — | — |
| particles | 2 | — | 2.5 | — |
| | 3 | — | — | 2.5 |
| Trimethylolpropane | | 5 | 5 | 5 |
| Glycerin | | 5 | 5 | 5 |
| Triethylene glycol | | 10 | 10 | 10 |
| TEGmBE | | 2 | 2 | 2 |
| EGmBE | | — | — | — |
| 1,2-Hexanediol | | 3 | 3 | 3 |
| Olfine E1010 | | 1 | 1 | 1 |
| Surfynol 104 | | 1 | 1 | 1 |
| N-Methylpyrrolidone | | — | 3 | — |
| 2-Methylpyrrolidone | | 3 | — | 3 |
| Triethanolamine | | 1 | 1 | 1 |
| Ultrapure water | | Balance | Balance | Balance |

In the table, TEGmBE represents triethylene glycol monobutyl ether.

EGmBE represents ethylene glycol monobutyl ether.

Production of Ink Compositions

Examples 11 to 16

Ink compositions 11 to 16 were produced according to the formulations specified in the table below in the same manner as in Examples 1 to 7.

TABLE 6

| Composition | | Example 11 | Example 12 | Example 13 | Example 14 | Example 15 | Example 16 |
|---|---|---|---|---|---|---|---|
| | | Addition amount (wt %) | | | | | |
| Pigment dispersion liquid | 1 | 40 | 40 | — | — | — | — |
| | 3 | — | — | 40 | 40 | 40 | 40 |
| Trimethylolpropane | | 5 | 5 | 5 | 5 | 5 | 5 |
| Glycerin | | 5 | 5 | 5 | 5 | 5 | 5 |
| Triethylene glycol | | 10 | 10 | 10 | 10 | 10 | 10 |
| TEGmBE | | 2 | 2 | 2 | 2 | 2 | 2 |
| 1,2-Hexanediol | | 3 | 3 | 3 | 3 | 3 | 3 |
| Olfine E1010 | | 1.0 | — | 1.0 | — | 0.6 | — |
| Surfynol 104 | | — | 1.0 | — | 1.0 | — | 0.3 |
| Emulgen 120 | | — | — | — | — | — | 0.6 |
| Emulgen 408 | | — | — | — | — | 0.3 | — |
| 2-Methylpyrrolidone | | 2 | 2 | 2 | 2 | 2 | 2 |
| Triethanolamine | | 1 | 1 | 1 | 1 | 1 | 1 |
| Ultrapure water | | Balance | Balance | Balance | Balance | Balance | Balance |

In the table, TEGmBE represents triethylene glycol monobutyl ether.
Emulgen 120 (manufactured by Kao Corp.) is a surfactant which is polyoxyethylene lauryl ether and has an HLB value substantially equal to Olfine E1010.
Emulgen 480 (manufactured by Kao Corp.) is a surfactant which is polyoxyethylene oleyl ether and has an HLB value substantially equal to Surfynol 104.

Evaluation of Ink Compositions (1) Gloss

Blotted image printing was carried out with an ink jet printer EM-930C (manufactured by Seiko Epson Corporation) at a resolution of 1440 dpi. In this case, PM photographic paper (tradename; model number KA 420 PSK, manufactured by Seiko Epson Corporation) was used as the recording medium. The printed matter thus obtained was allowed to stand under an environment of 24° C. for 24 hr and was then measured for the 20-degree gloss of the blotted image part with a gloss meter GM-268 (manufactured by KONICA MINOLTA).

The results of the measurement were evaluated according to the following criteria.

A: 20-degree gloss of not less than 60
B: 20-degree gloss of not less than 50 and less than 60
C: 20-degree gloss of less than 50

The results were as shown in the table below.

(2) Color Developing Property

Blotted image printing was carried out with an ink jet printer EM-930C (manufactured by Seiko Epson Corporation) at a resolution of 720 dpi. In this case, four types of plain papers, i.e., Xerox P (tradename, manufactured by FUJI XEROX OFFICE SUPPLY Co., Ltd.), Xerox R (tradename, manufactured by FUJI XEROX OFFICE SUPPLY Co., Ltd.), Xerox 4024 (tradename, manufactured by Xerox Corporation), and Recycle Cut R-100 (manufactured by Oji Paper Co., Ltd.), were used as the recording medium. The printed matter was allowed to stand under an environment of 24° C. for 24 hr and was measured for the OD value of the blotted image part with a Gretag densitometer (manufactured by Gretag Macbeth).

The results of the measurement were evaluated according to the following criteria.

A: Print density of not less than 1.2
B: Print density of not less than 1.1 and less than 1.2
C: Print density of less than 1.1

The results were as shown in the table below.

(3) Ejection Stability

Blotted images and line patterns were continuously printed at room temperature with the above ink jet printer. The number of times of cleaning operations of a printer nozzle necessary for recovery to normal printing from dot missing or ink droplet trajectory directionality problems caused during printing on 100 sheets or less was determined. The results were evaluated according to the following criteria.

A: Any cleaning operation was not necessary for the recovery.
B: Cleaning operation was necessary once to four times for the recovery.
C: Cleaning operation was necessary five times or more for the recovery.

The results were as shown in the table blow.

(4) Storage Stability of Ink

The ink compositions (50 g) were placed in aluminum bags. The bags were allowed to stand under an environment of 70° C. for one week. After the standing, each ink composition was inspected for the presence of foreign matter (sediment). The ink composition free from the presence of foreign matter was further inspected for a change in properties (viscosity, surface tension, pH, and particle diameter of resin particles).

The results were evaluated according to the following criteria.

A: There was neither foreign matter nor a change in properties.
B: There was a slight change in properties, although no foreign matter occurred.
C: There was foreign matter or a significant change in properties.

The results were as shown in the table below.

(5) Recovery from Clogging

Printing was continuously carried out for 10 min using the above ink cartridge and ink jet printer. After normal ejection of the ink through all nozzles was confirmed, in order to accelerate drying in nozzles, the ink cartridge was removed, and the recording head was removed from the head cap, followed by standing in this state under an environment of 40° C. and 20% RH for one week.

After the one-week standing, cleaning operation was repeated to determine the number of cleaning operations required for all the nozzles to normally eject the ink as in the initial state. The recovery from nozzle clogging was evaluated based on the number of cleaning operations according to the following criteria.

A: Recovered to the initial state by performing the cleaning operation once.
B: Recovered to the initial state by performing the cleaning operation twice to five times.

C: Recovered to the initial state by performing the cleaning operation six times or more.

The results were as shown in the table below.

(6) Fixation

On the recorded matter obtained above, the backside of the same type of a recording medium was put. A weight (200 g/size A4) was placed on the recording medium, and the printed face was rubbed twenty times by the weight.

The results were evaluated according to the following criteria.

A: No scratch mark was observed.

B: Some scratch mark caused by the rubbing was observed on such a level that is not substantially noticeable.

C: Noticeable scratch mark caused by the rubbing was observed.

The results were as shown in the table below.

(7) Hue

A solution prepared by diluting 0.5 g of the ink composition with 1000 ml of water was measured for UV spectral characteristics with U-3000 (manufactured by Hitachi, Ltd.). FIG. 1 shows absorption spectra for Examples 1, 6 and 7. Further, the value of A/B was calculated wherein A represents the maximum value of the absorbance in the wavelength range of 510 nm to 535 nm and B represents the maximum value of the absorbance in the wavelength range of 550 to 570 nm.

The results were as shown in the table below.

TABLE 7

Results of evaluation tests

| Ex. | Gloss | Color development | Ejection stability | Storage stability | Recovery from clogging | Fixation | Hue |
|---|---|---|---|---|---|---|---|
| 1 | B | A | A | A | A | B | 0.98 |
| 2 | B | B | A | A | A | B | 0.98 |
| 3 | B | B | A | A | A | B | 0.98 |
| 4 | A | A | A | A | B | B | 0.98 |
| 5 | A | A | A | A | A | B | 0.98 |
| 6 | A | B | A | A | A | B | 0.90 |
| 7 | A | A | A | A | A | B | 0.95 |
| 8 | A | A | B | A | B | A | 0.98 |
| 9 | A | A | B | A | A | A | 0.98 |
| 10 | A | A | A | A | A | A | 0.98 |
| 11 | B | B | B | A | A | B | 0.98 |
| 12 | B | B | B | B | B | B | 0.98 |
| 13 | B | B | B | A | A | B | 0.98 |
| 14 | B | B | B | B | B | B | 0.98 |
| 15 | B | B | B | B | B | B | 0.98 |
| 16 | B | B | B | B | B | B | 0.98 |

The invention claimed is:

1. An ink composition comprising at least a magenta solid solution pigment, dispersant polymer, which can render the pigment dispersible in the ink composition, acetylene compound, vinyl polymer particles, and water, the ink composition exhibiting a UV visible absorption spectrum,
   wherein at least one absorption peak is present at a wavelength of 510 nm to 535 nm and at least one absorption peak is present at a wavelength of 550 nm to 570 nm, and the maximum value A of the absorbance in the wavelength range of 510 to 535 nm and the maximum value B of the absorbance in the wavelength range of 550 nm to 570 nm satisfies a relationship of $0.95 \leq A/B < 1.0$
   wherein the dispersant polymer is produced by copolymerizing a monomer composition comprising at least a styrene macromer (A) and a salt forming group-containing monomer (B), and
   wherein the magenta solid solution pigment is a solid solution pigment comprising unsubstituted quinacridone and other quinacridone selected from the group consisting of 3,10-dichloroquinacridone, 2,9-dimethylquinacridone, and 2,9-dichloroquinacridone,
   wherein the vinyl polymer particles produced by copolymerizing a monomer composition comprising a polyoxyalkylene group-containing monomer (1), a salt forming group-containing monomer (2), and a monomer (3) copolymerizable with the polyoxyalkylene group-containing monomer and the salt forming group-containing monomer,
   wherein an average particle diameter of the vinyl polymer particles is 10 to 200 nm,
   wherein the polyoxyalkylene group-containing monomer polymerized by using monomer represented by the following formula:

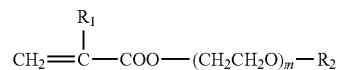

wherein $R^1$ represents a hydrogen atom or a methyl group; $R^2$ represents a hydrogen atom, an alkyl group having 1 to 20 carbon atoms or an alkylphenyl group having 1 to 9 carbon atoms; and m is a number of 1 to 30,
   wherein the amount of the vinyl polymer particles added to the ink composition is 0.1 to 3.0% by weight.

2. The ink composition according to claim 1, wherein the acetylene compound is represented by formula (a) or formula (b):

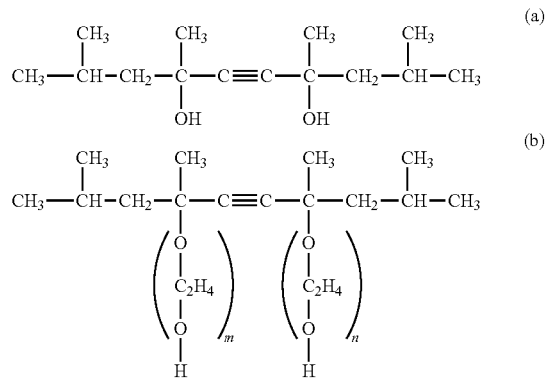

wherein m and n satisfy a requirement of m+n=10.

3. The ink composition according to claim 1, wherein the vinyl polymer particles have a weight average molecular weight of 150,000 to 500,000.

4. The ink composition according to claim 1, wherein the magenta solid solution pigment has an average particle diameter of 50 to 150 nm.

5. The ink composition according to claim 1, wherein the dispersant polymer is polymer particle, and the magenta solid solution pigment is covered with the dispersant polymer.

6. The ink composition according to claim 1, wherein the ink composition comprises at least one of butyl ether having glycol group selected from the group consisting of ethylene glycol mono-n-butyl ether, diethylene glycol mono-n-butyl ether, triethylene glycol mono-n-butyl ether, propylene glycol mono-n-butyl ether, and dipropylene glycol mono-n-butyl ether.

7. The ink composition according to claim 1, further comprising water soluble polyols, pyrrolidone, or mixtures thereof.

8. The ink composition according to claim 1, further comprising 1,2-hexanediol.

9. The ink composition according to claim 1, further comprising butyl ether having glycol group.

10. The ink composition according to claim 1, wherein the average particle diameter of the vinyl polymer particles is 10 to 110 nm.

* * * * *